Nov. 18, 1969 D. ORAM 3,478,792

DIGITALLY CONTROLLED WAVEFORM GENERATORS

Filed April 11, 1967 4 Sheets-Sheet 1

United States Patent Office 3,478,792

Patented Nov. 18, 1969

3,478,792

DIGITALLY CONTROLLED WAVEFORM GENERATORS

Daphne Oram, Tower Folly, Fairseat, Wrotham, Kent, England

Filed Apr. 11, 1967, Ser. No. 629,998
Claims priority, application Great Britain, Apr. 15, 1966, 16,684/66
Int. Cl. G05b *1/01*
U.S. Cl. 250—202 5 Claims

ABSTRACT OF THE DISCLOSURE

Oscillations are generated by recurrently scanning a graphical representation of a waveform with an electro-optical scanner and the output of the scanner is applied to a transducer. The waveform of the oscillations is determined by the graphical representation and the frequency by the recurrence frequency of scanning. Digital control of frequency is described.

Figure 1:
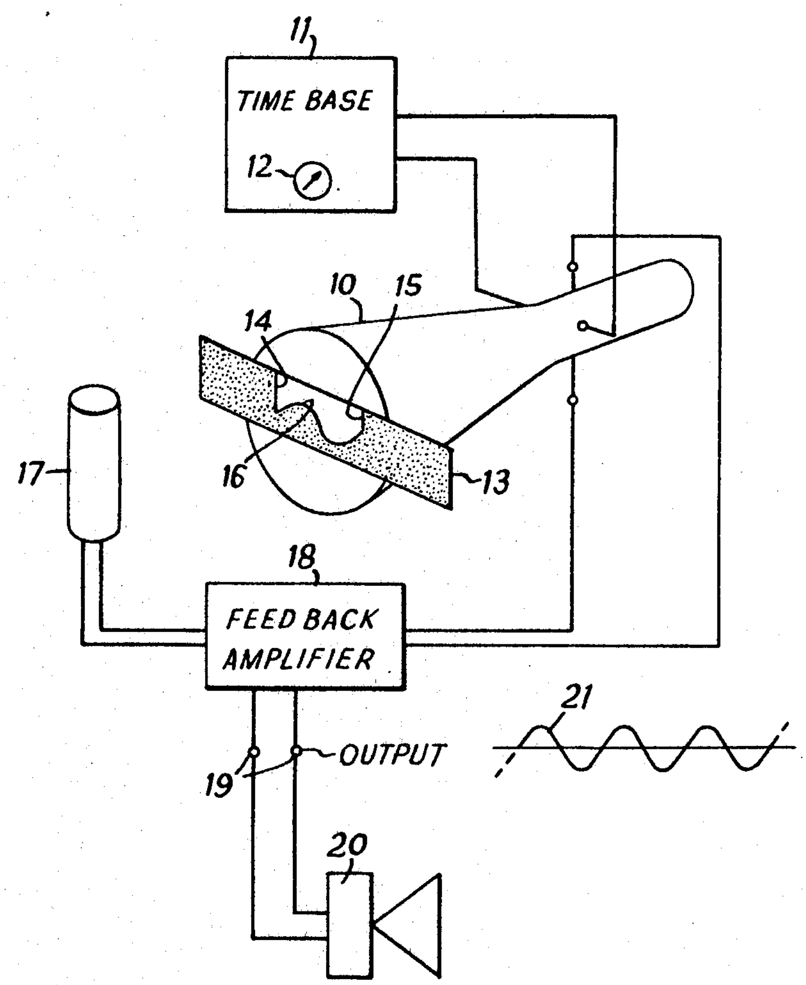

The present invention relates to the generation of oscillations.

It is sometimes required to be able to generate oscillations at any of a large number of frequencies and of a wide variety of different waveforms. This requirement arises, for example, in the generation of "electronic music" and in vibration testing.

Referring to electronic music in particular, many proposals have ben made such as those requiring recordings of oscillations on magnetic tapes and providing mixers and combiners whereby different combinations of the recorded oscillations at different levels and different frequencies can be effected to produce sounds and rhythms not readily obtainable in other ways.

Known methods suffer from limitations, however, which restrict the flexibility of composition or the ease with which electronic music can be composed, modified and performed.

It is one object of the present invention to provide an improved method of generating oscillations in which the frequency and waveform can readily be varied.

According to the present invention a method of generating an oscillation of predetermined waveform and fundamental frequency comprises the steps of providing a graphical representation of a waveform on a waveform carrier, electro-optically recurrently scanning the graphical representation of the waveform to regenerate recurrently the waveform as an electric oscillation, and applying the electric oscillation to a transducer. Thus by varying the scanning velocity the fundamental frequency of the electric oscillation can be varied. The waveform of the electric oscillation is determined by the graphic waveform which can readily be given any desired shape and the waveform can readily be varied by means of paint, ink or other medium used to apply the waveform to the carrier. The carrier may be transparent or light-reflecting.

One troublesome limitation applicable to the use of magnetic tapes in known methods is that the frequency of an oscillation reproduced from magnetic tape is dependent upon the speed of translation of the tape past a reproducing head. Thus if electronic music of a given rhythm is required to be reproduced with the same rhythm quickened this cannot be effected without an accompanying increase in the pitch of the music.

The present invention also enables this limitation to be overcome. For example if the frequency of the generated oscillations is changed in steps the number of steps per unit of time can be varied at will without altering the frequency of the oscillations in each step since the latter is determined solely by the velocity of scanning.

It will be appreciated that the invention readily permits of a mixture of analogue and digital control since the waveform of the generated oscillations is the analogue of the graphic waveform and the pitch, being determined by the velocity of scanning, can be varied under digital control.

Further according to the invention therefore the frequency of the generated oscillations as determined by the velocity of scanning is varied in steps under digital control.

The invention also provides apparatus for generating oscillations of variable waveform and fundamental frequency, the apparatus comprising an electro-optical scanning device adapted to scan a target in recurring scanning cycles for generating an electric oscillation having a waveform dependent upon the shape of the target, means for altering the scanning velocity independently of the target shape and brightness to vary the fundamental frequency of the oscillation, and a transducer so connected as to be energised by the generated electric oscillation.

In using a linear scan in the electro-optical scanner an interruption occurs in the generated oscillation on the occurrence of each flyback, but, for audio-frequencies, it has been found that by making the flyback sufficiently short, the reproduced audio tone is not noticeably affected by the flyback interruption. This interruption can be avoided if necessary by making use of a circular scan and providing a target waveform along a circular track. Alternatively a low-pass filter can be used to remove the flyback-transients from the output before application to the transducer.

Figure 2:
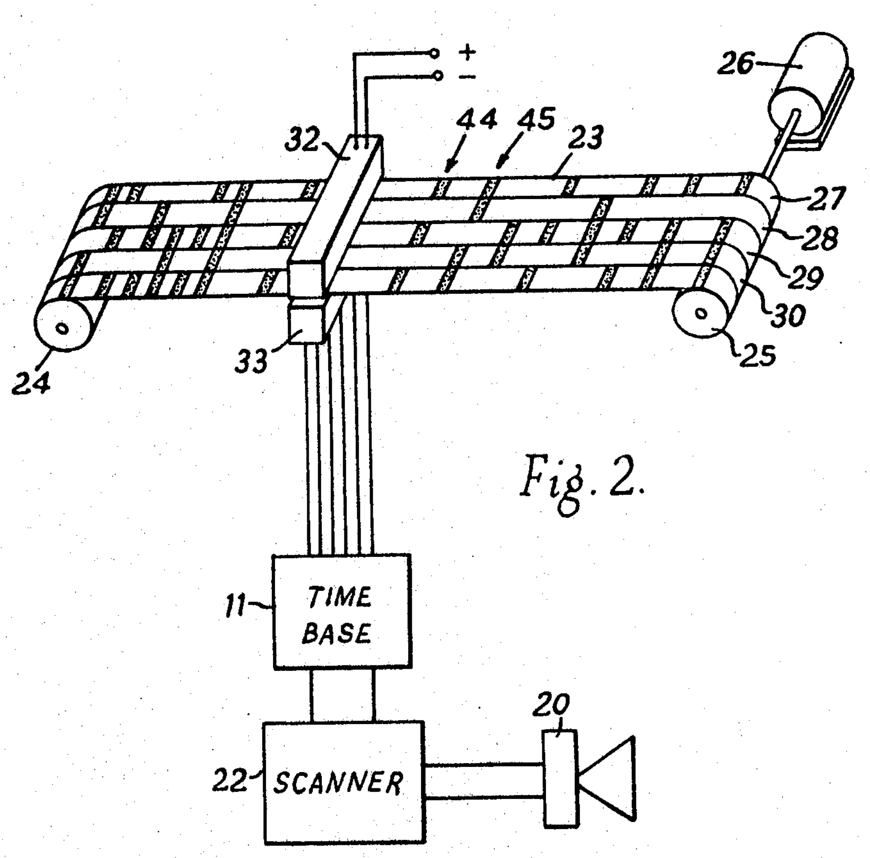
Figure 3:
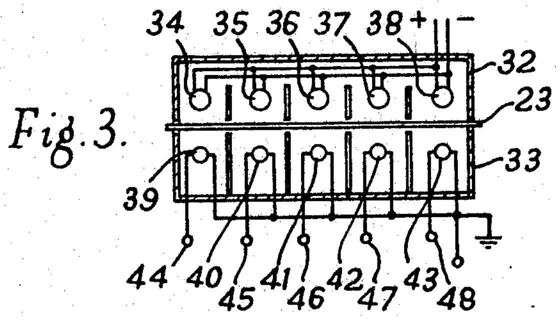
Figure 4:
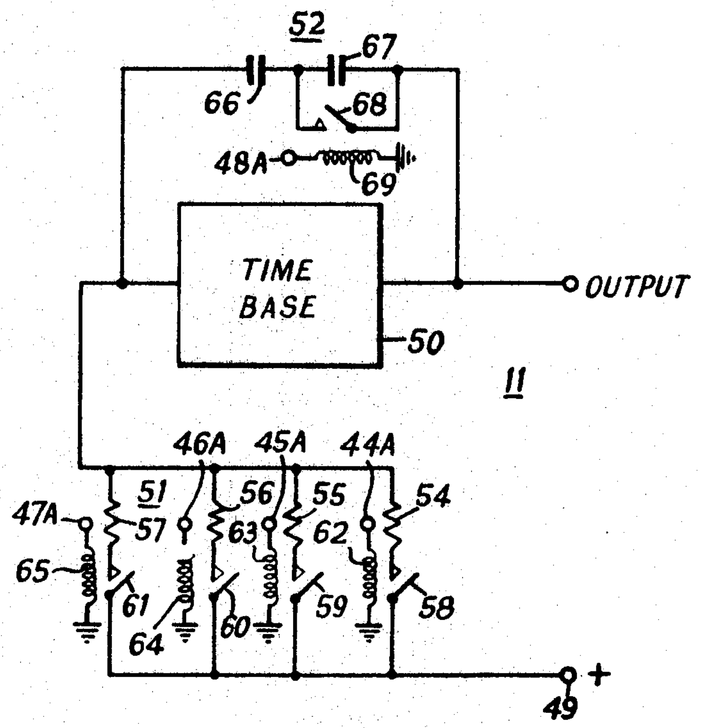
Figure 5:
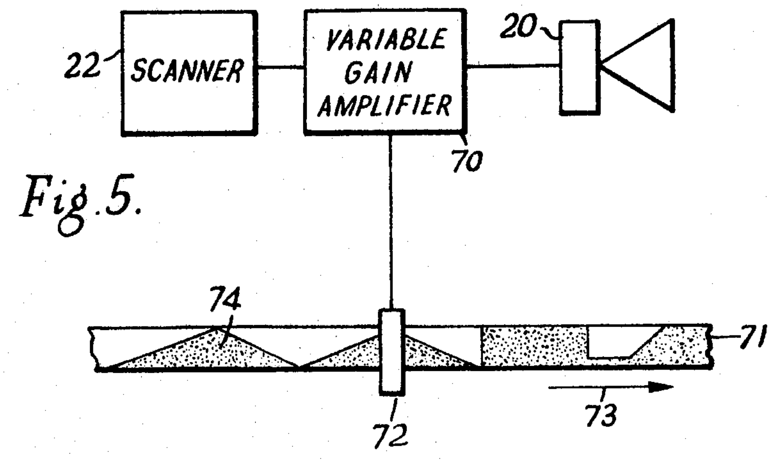
Figure 6:
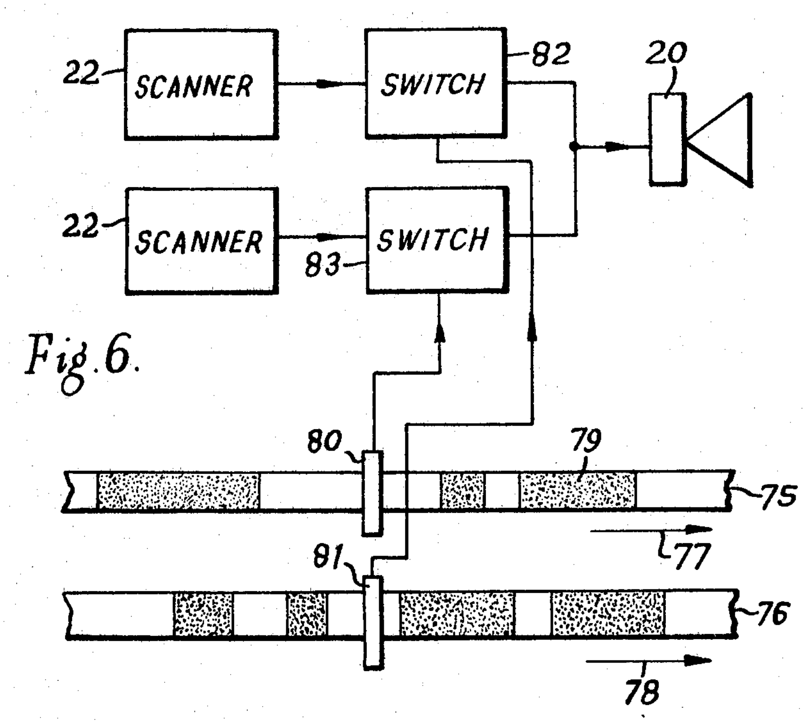

The invention will now be described, by way of example, with reference to the accompanying drawings, in which:

FIG. 1 is a schematic drawing of apparatus according to the invention for generating an audio tone of variable frequency and variable waveform, FIG. 2 is a schematic drawing of apparatus for digitally controlling the frequency of a tone generated by apparatus according to FIG. 1, FIG. 3 shows photo-electric apparatus of FIG. 2 in more detail, FIG. 4 is a circuit diagram of a time base of digitally-variable frequency for use in the arrangement of FIG. 2, FIG. 5 is a schematic drawing of a volume-control arrangement, and FIG. 6 is a schematic drawing of a scanner selector whereby any one or more of a plurality of scanners according to FIG. 1 can be selected to energise the loudspeaker.

Referring to FIG. 1 apparatus for enabling oscillations of variable waveform and frequency to be generated comprises a cathode ray tube 10 with electrostatic deflection plates (not shown). A time base circuit 11 is connected to the X-deflection plates of the tube 10 and is of any known or suitable construction for generating a recurring sawtooth deflection waveform with rapid flyback. The recurrence frequency of the sawtooth timebase waveform is variable by means of a control 12.

In front of the face plate of the cathode ray tube 10 and extending in the X-direction of deflection there is arranged an elongated strip 13 of transparent film. Between the boundaries 14 and 15 of a central region of the strip 13 there is drawn, in this example, one complete cycle of sinusoidal wave 16 this being accomplished by a pen or brush and ink. As is shown in FIG. 1 the area of the strip below the line 16 is covered with ink but a thick line is all that is necessary. The end regions of the strip extending to the boundaries 14 and 15 are also inked in.

Also in front of the face plate of the cathode ray tube, and arranged to receive light therefrom through the transparent areas of the strip 13 above the line 16, is a photo-electric device 17. The output of the device 17 is applied through a feedback amplifier 18 to the Y-deflection plates (not shown) of the cathode ray tube 10. In addition the output of the amplifier 18 is arranged to provide a bias voltage to the Y-deflection plates such that with the photo-electric device 17 disconnected the fluorescent spot on the face plate of the cathode ray tube follows a datum line parallel to and just above the upper edge of the strip 13 or above the uppermost strip 13 when more than one is used.

In operation, with the photo-electric device 17 connected to the feedback amplifier 18, the feedback to the Y-deflection plates is arranged to be in a sense such as to deflect the cathode ray beam downwardly until the fluorescent spot reaches the curve 16 and tends to be obscured by the inked-in region extending below the curve. The feedback is automatically reduced when this occurs and equilibrium is reached in which the spot is maintained on the curve 16. Thus the curve 16 is followed by the scanning spot and an output is derived from the amplifier 18 and applied through output terminals 19 to a loudspeaker 20. The output is, as shown by the curve 21, of the same waveform as the curve 16 but of course is a continuous oscillation of contiguous whole cycles.

The waveform shown at 21 is on the assumption that the flyback in the X-deflection is so short as not to cause a noticeable break between the successive whole cycles. Tests have shown that over the audio-frequency range the break between successive whole cycles can be made so small as not to be noticeable in the sound produced by the loudspeaker.

Alternatively the graphic waveform can be transposed into the form of a closed circular loop and the cathode ray tube arranged to scan in circular fashion. The datum scanning line is then arranged to be along a circle near the periphery of the face plate of the cathode ray tube or a small circle near the centre.

Yet another solution is to use the arrangement of FIG. 1 with scans of equal velocities in both the forward and return directions of scanning, together with inversion of the sign of the output for alternate cycles.

Although FIG. 1 shows one complete cycle of a sine wave on the transparent strip 13 it will be appreciated that a half-cycle could be used and switching apparatus added to invert alternate half-cycles at the output 19. It will also be appreciated that more than one cycle can be provided graphically on the strip 13. It may sometimes be convenient to have two cycles extending between the boundaries 14 and 15. A single cycle is, however, usually preferred.

Furthermore although the carrier for the graphic waveform is shown to be transparent and light is transmitted through it to the photo-electric device 17 it will be understood that light-reflection from the carrier instead of light-transmission through it could alternatively be used.

In FIG. 1 the time base frequency and hence the velocity of scanning is shown to be variable continuously by means of a control 12.

It is a subsidiary feature of the invention to use digital control for this purpose and one embodiment embodying this feature is shown in FIG. 2.

In FIG. 2 the time base 11 and the loudspeaker 20 correspond to the time base 11 and loudspeaker 20 of FIG. 1. The scanner 22 of FIG. 2 embodies the cathode ray tube 10, strip 13, photo-electric device 17 and amplifier 18 of FIG. 1.

To effect digital control of the time base 11 there is provided a transparent strip 23 which can be wound from a storage reel 24 on to a take-up reel 25 by means of a motor 26. The strip 23 is divided into five longitudinal sections 27, 28, 29, 30 and 31 and passes between five light sources in a housing 32 (or a single common light source) and five photo-electric devices in a housing 33. These are shown in more detail in FIG. 3. The housing 32 is divided into five compartments containing five lamps 34, 35, 36, 37 and 38 respectively. The housing 33 is divided into five compartments containing five photo-electric devices 39, 40, 41, 42 and 43 respectively which are in register with the five lamps respectively in the housing 32.

The strip 23 passes between the two housings, as shown, with the five sections of the strip in register with the five compartments respectively in each of the two housings 32 and 33.

As shown in FIG. 2 at different locations along the strip 23 different combinations of the strip sections 27 to 31 are inked-in to render them opaque. For example at a location 44 sections 27, 29 and 31 are inked-in and at a location 45 sections 27, 28, 30 and 31 are inked-in. Thus in operation as different locations along the strip 23 reach the housings 32 and 33 different combinations of the photo-electric devices 39 to 43 are obscured and provide pulses at different combinations of output terminals 44 to 48 connected to the devices 39 to 43 respectively. These pulses are used to shift the time base frequency to different values dependent upon the different combinations selected.

For this purpose an arrangement as shown in FIG. 4 can be used. In FIG. 4 a linear time base is shown employing an integrator in which a fixed voltage applied at the terminal 49 is applied to a time base amplifier 50 through a stepwise-variable resistance-network 51. A stepwise-variable capacitor-network 52 is connected between the output and input of the amplifier 50. Thus the circuit is basically a Miller integrator. The frequency of operation is determined by the magnitudes of the effective resistance of the network 51 and effective capacitance of the network 52.

The resistance network 51 includes four resistors 54 to 57 which can selectively be connected in parallel to the input of the amplifier 50 by relay contacts 58 to 61 respectively. The contacts 58 to 61 are controlled by windings 62 to 65 respectively which are connected to terminals 44A to 47A respectively.

The terminals 44 to 47 of FIG. 3 are connected through any suitable drive circuits (not shown) to the terminals 44A to 47A. The drive circuits respond to the pulses provided at the terminals 44 to 47 to energise the relays 62 to 65 correspondingly and to hold them energised until the next set of impulses is received from the terminals 44 to 48. Bi-stable circuits with a common re-set circuit are suitable for this purpose.

The capacitor-network 52 includes two capacitors 66 and 67 of which 66 is permanently in circuit and 67 can be short-circuited by relay contacts 68 controlled by a relay-winding 69. The relay-winding 69 is connected to a terminal 48A and the terminal 48 of FIG. 3 is connected to the terminal 48A of FIG. 4 through a suitable drive-circuit (not shown) which responds to a pulse at the terminal 48 to energise the relay 69 and hold it energised until the next set of impulses at the terminals 44 to 48. Again a bi-stable circuit with re-set common to the previously mentioned bi-stable circuits can be used.

The resistor 53 can be shunted by any one or more of the resistors 54 to 57 to provide ascending frequencies over a first range. By switching in the capacitor 67 the scale could be continued over a higher range.

It will be appreciated that as each frequency is held until the next succeeding set of pulses appears at the terminals 44 to 48 the speed of movement of the strip 23 does not alter the frequencies generated but merely the rate at which the stepwise variation from each frequency to the next occurs.

The embodiment shown can be developed in several ways to increase the flexibility of its use.

FIG. 5 shows the scanner 22 connected to the transducer 20 through a variable-gain amplifier 70. A further transparent strip 71 is provided in conjunction with a photo-electric sensing device 72. The strip 71 is moved in the direction of the arrow 73 at the same speed as the strip 23 of FIG. 2 and has opaque regions of varying width and length such as the region 74 applied any suitable way, for example with brush and ink. The width of the opaque region in register with the photo-electric device 72 determines the output of the photo-electric device which is applied to control the gain of the amplifier 70. In this way the volume of the sound produced by the loudspeaker 20 can be varied as required. As an alternative that may be preferred a cathode ray tube and photo-electric device can be used as described with reference to FIG. 1 to cause the cathode ray spot to follow a curve on the strip 71 and provide an output for volume control.

Using the same approach a further strip (not shown) can be provided with an undulating curve to provide slight frequency-modulation (or wobbulation) of a digitally selected frequency to simulate vibrato.

In another development shown in FIG. 6 several scanners 22 are provided for generating oscillations which can be arranged to differ both as to their frequencies or frequency ranges and the waveform of the oscillations they generate. Each can be controlled digitally as described, for example, with reference to FIGS. 2, 3 and 4, each scanner having a control strip 23 (FIG. 2) individual thereto.

In FIG. 6 two further strips 75 and 76 are provided (which could be two separate tracks on a common strip) and are arranged to move in the direction of the arrows 77 and 78 at the same speed as the strip 23 of FIG. 2. Each strip has areas such as the area 79 in which the strip is rendered opaque across its entire width.

Two photo-electric sensing devices 80 and 81 co-operate with the two strips 75 and 76 respectively and are connected to two switches 82 and 83 as shown which are connected between the scanners 22 and the loudspeaker 20.

It will be appreciated that the outputs from each of the devices 80 and 81 is either of two values depending upon whether a transparent or opaque region of the associated strip is in register therewith. The outputs of the devices 80 and 81 are therefore suitable to close and open the associated switches 82 and 83 whereby either scanner, or both scanners or neither can be selected for connection to the loudspeaker 20.

By means of a combination of the arrangements of FIGS. 1 to 6 any desired rhythms, rate of rhythms, frequencies, waveforms, volumes and combinations thereof can be selected and used to produce sounds with the associated parameters required to create audibly acceptable phenomena.

It is further proposed to arrange that several scanners of the form shown in FIG. 1 are operated synchronously that is at identical frequencies from a common time-base controlled by a single strip of film as shown in FIG. 2. The different scanners can be arranged to generate oscillations of different waveforms and by means of the volume controls and switching apparatus described selection and mixing can be effected not only for producing complex tone colours but also, for example, in process control where there is a need for varying any particular quantity and giving an operator a visual indication of the adjustment made.

It will be appreciated that the transducer 20 can be replaced by transducers of other forms. For example it may be required to record the outputs of the scanner or scanners in which case the loudspeaker 20 is replaced by a recording device such as a magnetic recording head.

Furthermore the invention is not limited to the production of sounds and may be used for applications such as vibration testing with different waveforms and frequencies.

In addition it will be understood that the simple frequency control described with reference to FIGS. 2, 3 and 4 can be developed to more complex digital forms. In one proposed arrangement there are sixteen tracks instead of the five shown and described, the ocsillator circuit of FIG. 4, being appropriately modified to include sixteen switched resistors and only one capacitor.

It is also envisaged that the scanned strip in FIG. 1 and the scanning means can be in other forms. For example the waveform can be in the form of an emulsion of varying density as has been used for the sound track of a cinematograph film and the scanning spot can be caused to scan over it in a straight line.

I claim:

1. In apparatus for generating oscillations of variable waveform and fundamental frequency comprising an optical, recurrent scanning device, a light-responsive device positioned to be scanned recurrently by said scanning device, a target in the light path between said scanning device and said light-responsive device for determining the waveform of signals generated by means of said scanning device, and means for altering the scanning frequency of said scanning device, the provision of digital control means for controlling said frequency-altering means, said digital control means comprising

- a multi-track record,
- a sensing head having a plurality of sensing devices, one for each track,
- transport means for moving said record past said sensing devices, and
- means responsive to the outputs from different ones and different combinations of said sensing devices for altering said scanning frequency to provide different values of said scanning frequency.

2. Apparatus according to claim 1 wherein each track of said multi-track record has one or more relatively transparent areas and one or more relatively opague areas, and said sensing head includes lighting means arranged to direct light upon a plurality of light-sensitive devices whereby the passage of said record between said lighting means and said light-sensitive devices causes variations in the outputs of said light-sensitive devices.

3. Apparatus according to claim 1, and further including a transducer;

a variable-gain amplifier connected between said scanning device and said transducer, and means for varying the gain of said amplifier in a predetermined manner.

4. Apparatus according to claim 3, wherein said means for varying the gain of said amplifier comprises a gain control record having gain variations recorded thereon, a second sensing head responsive to the gain variations on said gain control record for applying a gain control voltage to said amplifier, and second transport means for moving said gain control record relative to said second sensing head.

5. In an apparatus for generating oscillations of variable waveform and fundamental frequency comprising an optical, recurrent scanning device, a light-responsive device positioned to be scanned recurrently by said scanning device, a target in the light path between said scanning device and said light-responsive device for determining the waveform of signals generated by means of said scanning device, and means for altering the scanning frequency of said scanning device, the provision of digital ocntrol means for controlling said frequency-altering means, said digital control means comprising

- a multi-track digital record,
- a sensing head for generating digital signals from said record,
- transport means for moving said record past said sensing head, and
- means responsive to different digits and different combinations of diigts represented by said digital signals for altering said scanning frequency to provide different values of said scanning frequency.

(References on following page)

References Cited

UNITED STATES PATENTS

| | | | |
|---|---|---|---|
| 2,604,955 | 7/1952 | Hawkins | 235—197 X |
| 2,900,861 | 8/1959 | Davis | 84—1.28 |
| 2,907,888 | 10/1959 | Maure et al. | 235—198 X |
| 2,989,885 | 6/1961 | Pearson | 84—1.28 X |
| 3,015,979 | 1/1962 | Davis | 84—1.28 X |
| 3,140,337 | 7/1964 | Williams | 84—1.28 X |
| 3,195,113 | 7/1965 | Giordano. | |

OTHER REFERENCES

Sunstein: Electronics, February 1949, pp. 100–103.

RALPH G. NILSON, Primary Examiner

C. M. LEEDOM, Assistant Examiner

U.S. Cl. X.R.

84—1.28; 235—198; 250—219; 328—14